US011097903B2

(12) United States Patent
    Lamb et al.

(10) Patent No.: US 11,097,903 B2
(45) Date of Patent: Aug. 24, 2021

(54) BOARD CONVEYOR APPARATUS FOR USE IN A BOARD PROCESSING SYSTEM

(71) Applicant: Automated Industrial Technologies, Inc., Forest, VA (US)

(72) Inventors: Charles D. Lamb, Forest, VA (US); Shawn Little, Lynchburg, VA (US)

(73) Assignee: Automated Industrial Technologies, Inc., Forest, VA (US)

( * ) Notice: Subject to any disclaimer, the term of this patent is extended or adjusted under 35 U.S.C. 154(b) by 0 days.

(21) Appl. No.: 16/852,976

(22) Filed: Apr. 20, 2020

(65) Prior Publication Data
   US 2020/0346875 A1  Nov. 5, 2020

Related U.S. Application Data

(60) Provisional application No. 62/841,862, filed on May 2, 2019.

(51) Int. Cl.
    *B65G 47/24*  (2006.01)
    *B65G 47/31*  (2006.01)
    *B65G 47/72*  (2006.01)
    *B65G 37/00*  (2006.01)

(52) U.S. Cl.
    CPC .......... *B65G 47/24* (2013.01); *B65G 37/005* (2013.01); *B65G 2201/0217* (2013.01); *B65G 2203/0225* (2013.01); *B65G 2207/14* (2013.01)

(58) Field of Classification Search
    None
    See application file for complete search history.

(56) References Cited

U.S. PATENT DOCUMENTS

| 2,786,565 | A | * | 3/1957 | Eckart | B65G 47/24 198/406 |
| 2,868,400 | A | * | 1/1959 | Powischill | B65G 15/24 414/808 |
| 3,306,425 | A | * | 2/1967 | Bodnar | B65G 47/24 198/399 |
| 5,873,448 | A | * | 2/1999 | Tsai | B65G 47/24 198/360 |
| 6,491,154 | B2 | * | 12/2002 | Ydoate | B65G 47/31 198/444 |
| 7,311,191 | B2 | * | 12/2007 | Bahr | B65G 47/2445 198/396 |
| 7,921,981 | B2 | * | 4/2011 | Bastasch | B65G 47/24 198/390 |
| 2001/0013461 | A1 | * | 8/2001 | Boucherie | B65G 47/31 198/459.8 |
| 2007/0199799 | A1 | * | 8/2007 | Kurachi | B65G 47/24 198/560 |

FOREIGN PATENT DOCUMENTS

JP   60244701 A  * 12/1985 ............. B65G 47/24

* cited by examiner

*Primary Examiner* — Kavel Singh
(74) *Attorney, Agent, or Firm* — John H. Thomas, P.C.

(57) ABSTRACT

An unscrambler machine receives a load of wooden boards in its hopper. The unscrambler steadily dispenses one board at a time onto a grading "waterfall" conveyor. When the board leaves the unscrambler, it is relatively aligned, but not always adequately aligned, perpendicular to the direction of travel of the conveyor. In the case that multiple tiered "waterfall" conveyors are used, the board is cascaded down each waterfall configuration and will continue to be straightened out by nature of the effect of gravity on the board as it slides down to encounter the conveyor chain of each conveyor tier.

18 Claims, 7 Drawing Sheets

BOARD CONVEYOR APPARATUS FOR USE IN A BOARD PROCESSING SYSTEM

This application claims the benefit of U.S. Provisional Application No. 62/841,862, filed on May 2, 2019, which is incorporated by reference herein.

The present conveyor apparatus is intended for use in a larger board processing system. The waterfall apparatus is part of a board singulation and metering system intended for use between board manufacturing components such as an unscrambler machine and a board processing machine like a board notcher or board stacker machine.

BACKGROUND

In the lumber industry, notcher machines are one example of wood processing machines and are used to produce slotted cuts on one side of a board in order for the boards to be used as pallet stringers. This process requires boards being fed into a notcher machine. It is standard practice in the lumber industry for wood processing machines such as an unscrambler machine, a stacking machine, notcher machine, trim saw, or other board feeding mechanism, to be connected with conveyor systems. These conveyor systems serve several purposes a few of which are the following: the conveyors serve as grading surfaces for defective boards to be removed, they serve as metering surfaces where boards can be spaced in the proper array using different methods and being straightened before they enter the processing machine, and the conveyors can be used as a means to guide boards from one elevation exit of a first machine to another elevation entry of a second machine. These conveyors are manned by workers whose job is to straighten boards that are entering the next machine to ensure the boards do not enter at an undesirable angle to the direction of travel. It is desired to reduce the number of workers operating a machine by automating some of the process. This will ensure the workers can be utilized elsewhere in the process.

The wood processing industry, an example of which is pallet building, has developed to include several standard machine types which allow for a production line to function efficiently. One of the most important of these machine types is the unscrambler machine. This machine takes its name from its function; the unscrambler takes the product (in the wood processing industry, product is in the form of wooden boards) which is piled in the hopper and quickly dispenses boards in intervals onto a belt or chain conveyor system to produce an even array of boards. Boards are placed in the unscrambler hopper and a series of chains, on which are fastened special lugs (at intervals), rotate and pull boards out of the hopper and up a curved or straight incline ramp 2 ft to 6 ft or more to the top of the unscrambler. At the end of the lug chains the boards slide down a ramp to accelerate away from the lugs. The unscrambler singulates wood boards that are piled on top of each other, straightens the boards against the lugs on the chain and then dispenses the boards onto a conveyor system. Methods exist to start and stop and vary the speed of the unscrambler machine to ensure boards are "metered" out of the unscrambler machine at a steady rate. This avoids an overflow of boards traveling downstream. Also, unscramblers may alternatively dispense boards from off their incline ramps directly into adjacent wood processor machines such as stackers and notchers. Because of the requirement to accelerate the boards away from the lugs of the unscrambler chain, some of the straight boards become angled to the direction of travel as they exit the unscrambler. The longer the exit ramp, the more the boards can get angled. The faster the unscrambler is needed to run, the more boards there can be that are angled on the ramps as they exit.

Part of the conveyor system is used as a location where operators can remove bad boards (essentially "grade" the boards moving downstream). A grading conveyor, as previously mentioned, is normally positioned between the exit of a first wood processing machine and the entry of another wood processing machine. This form of conveyor acts as a bridge between two machines where the exit of one and the entry of the other machine may be at different elevations. The grading conveyor can be used as a quality control measure as it provides time for electrical photo-eye sensors and mechanisms or a human worker to turn over all boards, inspect them and remove a defective boards or boards that were not cut properly before these boards enter the next machine. The grading conveyor width depends on the application and length of wood boards being run, and the conveyor speed can be increased or decreased to aid in regulating the quantity of boards flowing downstream. This will ensure a steady flow of product into the downstream wood processing machinery. Another use for a grading conveyor is to cingulate boards when an unscrambler is not used. This refers to the method of separating a large batch or collection of boards into individual boards or small groups of boards.

FIGS. 1 and 2 illustrate a conventional unscrambler and grading conveyor system 10. The system 10 includes an unscrambler 12 and a grading conveyor 14. Boards 20 are taken from a hopper 16 by a transport chain with lugs 18 upwardly to the start of grading conveyor 14. The boards move in the upward direction 19 up the unscrambler 12 and then from left to right in direction 15 down a grading conveyor 14. It may be noted that there can be little or no difference between the top height of the transport chain with lugs 18 and the conveyor 14. As shown in FIG. 1, some of the boards 20 are crooked on the conveyor 14.

SUMMARY

One commonly adopted method of using a grading conveyor is to singulate boards. This refers to the method of separating a large batch or collection of boards into individual boards or small groups of boards. Singulation can be achieved by the "waterfall" method and apparatus described herein. In this method a board is placed onto the grading conveyor and carried up or down the conveyor incline. Upon reaching the top of the incline (the end of the grading conveyor), the board is dropped off the end onto another grading conveyor to repeat the process. In one example, a notcher machine is positioned at the end of a conveyor line to receive the boards that waterfall off of the grading conveyor. Each time the board reaches the apex of a conveyor "tier" it rolls over the end and slides along the guide ramps downward to the next conveyor tier. In this example, each conveyor tier is progressively moving faster than the previous tier, and this enables the boards to be spaced out. (More or less spacing, and therefore conveyor speed, is a function of a particular application. For instance, faster unscramblers are by nature less than 100% effective at feeding one board for each lug position on the chain, so they typically run 50 to 100% faster chain speed than conveyor speed to compensate. As a result, the next conveyor or process in the system always has to have enough space for two boards at the highest speed. The higher speeds mean larger forces that must be absorbed if the only means of straightening a board is to slam it into the group of boards that are waiting to feed the next position. Having two or more conveyors in a waterfall allows a landing space to be available for every board and the flexibility to run the second conveyor slower to close the gaps created by empty lug positions on the unscrambler.) Without the waterfall method and apparatus described herein, boards would have the potential to become crooked, angled, or double stacked with respect to the flow of the conveyor. This would give the tendency for boards to fall off the end of a conveyor in a non-uniform manner. If a machine hopper is positioned at the end of the conveyor and the boards leave the conveyor crooked and enter the machine incorrectly, the boards can be cut incorrectly or jam in a downstream machine as a result.

In one example, a board conveyor apparatus for use in between components of a board processing system comprises a first conveyor, a second conveyor and a third conveyor connected end to end to each other, wherein the first conveyor, second conveyor and third conveyor each have their own first end and second end with a direction of travel from the first end to the second end of each first conveyor, second conveyor and third conveyor. The second end of the first conveyor is adjacent the first end of the second conveyor whereby boards are conveyed on the first conveyor onto the second conveyor, and wherein the second end of the second conveyor is adjacent the first end of the third conveyor. A plurality of boards is adapted to be aligned on the first, second and third conveyors relatively perpendicular to the direction of travel of the boards. The board conveyor apparatus further comprises a multiple waterfall configuration wherein the second end of the first conveyor is relationally above the first end of the second conveyor and the second end of the second conveyor is relationally above the first end of the third conveyor, wherein boards moving on the second end of the first conveyor will fall by gravity onto the first end of the second conveyor, and boards moving on the second end of the second conveyor will fall by gravity onto the first end of the third conveyor, whereby the action of boards falling by gravity will straighten the boards so that they are more aligned in the perpendicular orientation relative to the direction of travel. The system may further comprise four or more conveyors connected end to end with each other in a line with each conveyor having a first end and a second end, and there is a waterfall configuration wherein the second end of a conveyor in the direction of travel is relationally above the first end of the next adjacent conveyor in the direction of travel, thereby creating three or more waterfall configurations to better straighten boards in the perpendicular orientation to the direction of travel of the boards along the conveyor apparatus. The waterfall configuration may comprise a ramp from the second end of the first conveyor to the first end of the second conveyor to guide the fall of a board from a top surface of the first conveyor to a top surface of the second conveyor. The system may comprise a swinging stop having a flat pendulum positioned above a first conveyor surface, and a height of the swinging stop above the first conveyor surface is adapted so that the stop will physically engage a board traveling on the first conveyor surface, and wherein the swinging stop acts to first straighten the board but then swing out of the way and allow the board to continue to travel in the direction of travel on the conveyor apparatus. The first conveyor surface defines a width that is perpendicular to the direction of travel, and the swinging stop has a width that is equal to or greater than the width of the first conveyor surface. The swinging stop may be suspended above the first conveyor surface by a gantry that is connected to the swinging stop by at least two cords. The first conveyor surface may be the top surface of the second conveyor, or alternatively the top surface of the third conveyor. The swinging stop may have a first weight equal to or greater than a second weight of a board traveling on the conveyor. A waterfall height defined by the difference in a height of the second end of the first conveyor and a height of the first end of the second conveyor may be equal to or greater than a width of a board traveling on the conveyor apparatus, or alternatively, defined by the difference in a height of the second end of the first conveyor and a height of the first end of the second conveyor is from 3 to 16 inches, or still further alternatively, from 4 to 12 inches, or alternatively, from 5 to 9 inches. A waterfall height defined by the difference in a height of the second end of the preceding conveyor and a height of the first end of the following conveyor may be different from waterfall to waterfall on the conveyor apparatus. A height defined by the difference in a height of the first end of the first conveyor and a height of the second end of the last conveyor may be equal to or approximately zero, or a height of the first end of the first conveyor is lower than a height of the second end of the last conveyor whereby there is a lift of a board traveling on the conveyor apparatus, or further alternatively, a height of the first end of the first conveyor is higher than a height of the second end of the last conveyor whereby there is a lowering of a board traveling on the conveyor apparatus. The apparatus may further comprise a swinging stop having a flat pendulum positioned above a first conveyor surface and proximate the second end of the first conveyor, a height of the swing stop above the first conveyor surface adapted so the stop will physically engage a board traveling on the first conveyor surface, and a distance of the flat pendulum from the second end of the first conveyor surface that permits a straight board to rotate off the end of the first conveyor surface without causing the stop to swing backwards, wherein the swinging stop acts to first straighten the board but then is positioned so the board will rotate over the end of the conveyor and pass under the swinging stop.

DETAILED DESCRIPTION

Figure 1:
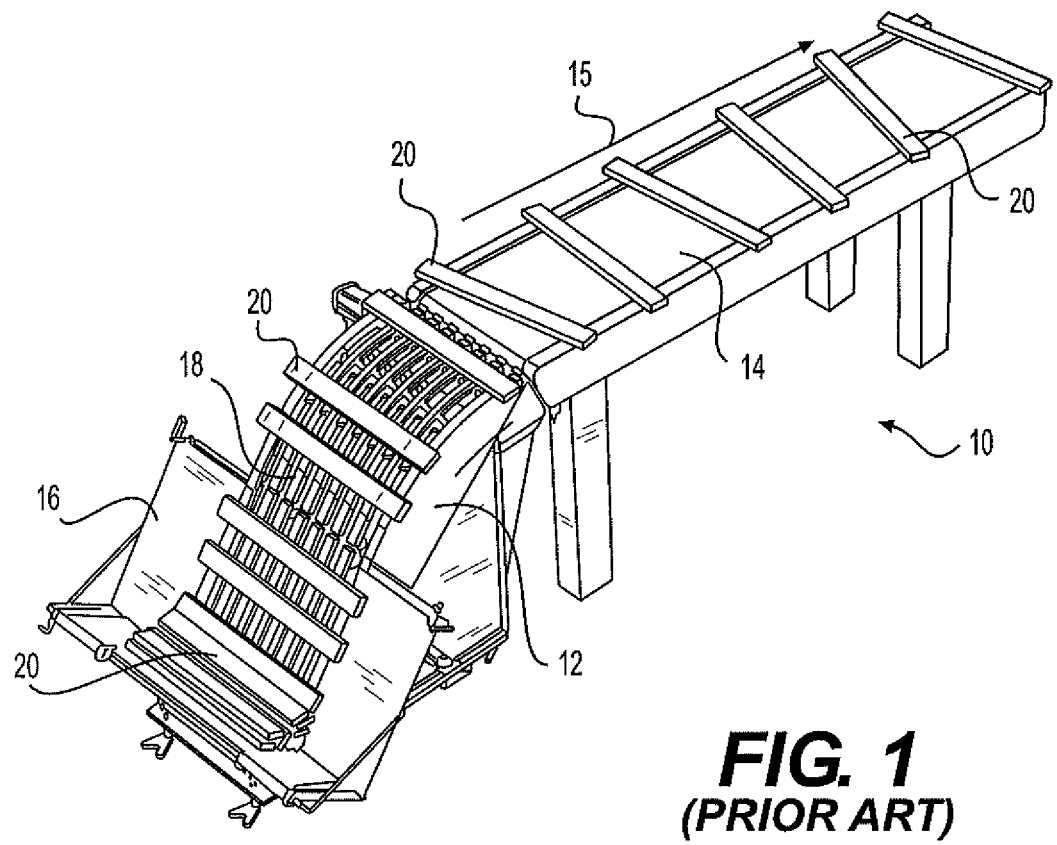
FIG. 1 is a perspective view of an unscrambler machine loading onto a conventional flat conveyor.
Figure 2:
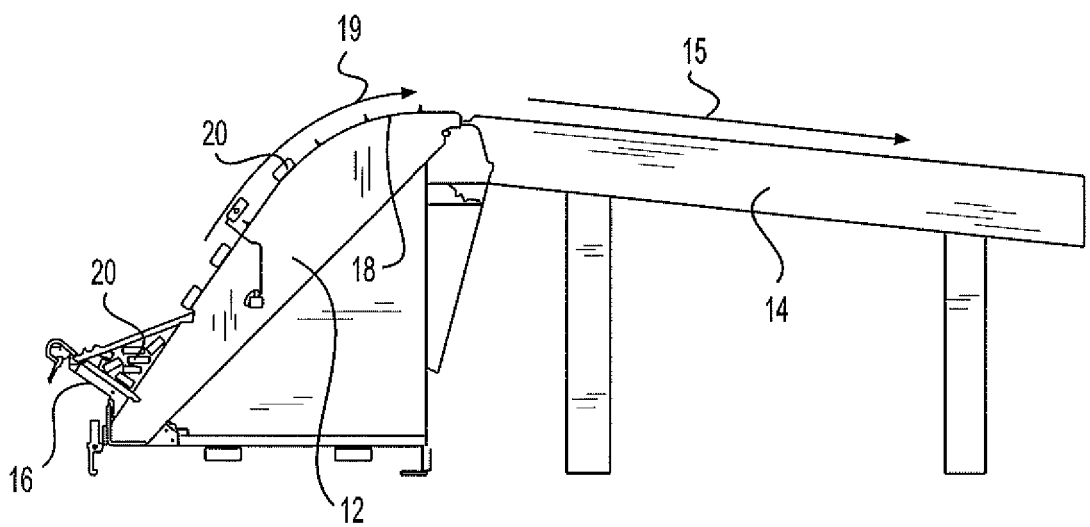
FIG. 2 is a side view of the unscrambler machine and conventional flat conveyor as shown in FIG. 1.

The present invention describes an apparatus and method of using an Advanced Board Singulation And Metering System (ABSAMS) between a wood processing notcher machine, board stacker, board unscrambler, or any machine that is processing or transporting the board and another machine that is receiving the board to be stacked, cut, or modified in any way.

In one example, an unscrambler machine receives a load of wooden boards in its hopper. The unscrambler steadily dispenses one board at a time onto a "waterfall" conveyor. When the board leaves the unscrambler, it is relatively aligned, but not always adequately aligned, perpendicular to the direction of travel of the conveyor. In the case that multiple tiered "waterfall" conveyors are used, the board is cascaded down each waterfall configuration and will continue to be straightened out by nature of the effect of gravity on the board as it slides down to encounter the conveyor chain of each conveyor tier. The waterfall system allows the unscrambler to run faster (more boards per minute) and dispense more boards that are not perpendicular to the direction of travel and the occasional board that is on top of another board. The multiple short drops from conveyor to conveyor in the system described herein finishes the singulation and straightening of boards downstream from the unscrambler without active stops or manual intervention by an operator, With a single conveyor and a minimal elevation change of for instance less than 2 ft.-3 ft., it is difficult to passively or manually singulate two stacked boards and straighten them both at a speed greater than 10 to 20 boards per minute. A system as described herein and as used in the pallet industry is capable of handling boards at 125 plus boards per minute.

The effect of gravity assists in straightening out the board as follows. As the board travels from a conveyor or unscrambler, it may be at a slight angle with respect to the direction of travel (boards may be crooked while traveling on the conveyor). As the board reaches the end of the conveyor tier, it rolls over the top of the end sprockets and, in the tipping motion that results, the board experiences an element of gravity pulling it downward to contact the next adjacent conveyor tier. It is during this moment when gravity is acting fully, that the end of the board that is the furthest ahead contacts the next tier of the conveyor, it stops and the other end of the board falls to contact the next tier. The board fully rests on the next conveyor tier for an instant before continuing to be conveyed by the movement of the conveyor chains. Each tier runs at a different speed and meters the layers of boards to the next process. This ensures there is an even stream of boards passing downstream without regions of stacked boards or boards piled up as this can cause jams.

The waterfall configuration between conveyors may or may not include a guide ramp. The waterfall configuration requires that the first conveyor top surface in the line series of conveyors have at its exit end or second end in the direction of travel a height greater than the height of the front end or first end of a second or subsequent conveyor top surface in order to create the fall of the board to assist in the straightening process. The waterfall configuration height, also referred to as drop height, is measured as the height between a conveyor surface and the next following conveyor surface, because this is the height that the board falls and is pulled downwardly by gravity in between conveyor surfaces. The waterfall configuration height is measured from the top surfaces of the respective adjacent conveyors. The waterfall configuration height is 2 to 24 inches, or alternatively 5 to 7 inches. The waterfall configuration height may also be described as a height greater than the width of the boards intended to be carried along the conveyor, for example, greater than four inches (in the example of a 2×4), or greater than six inches (in the example of a 2×6).

A waterfall configuration may be a simple drop-off in height between the top surfaces of respective first and second conveyors that allows the board to free-fall between the conveyors. However, alternatively, there may be a guide ramp that supports a board from the top surface height of a first conveyor to the top surface height of the second, lower conveyor. This guide ramp may be a flat ramp surface, or it may be a set of two or more parallel rails that carry the board. The slope, placement, length and shape of the guide ramps between one conveyor and the next in the cascade is influenced by several characteristics of the boards, the speeds required to move the quantity of boards, and the spacing requirements of the next step in the process. Ramps are positioned so that they will be spaced apart at a distance relatively close to the length or distance between the ends of the shortest boards to be used on the system in order to minimize the exaggeration of mis-alignment due to pivoting about the middle of a board. In most cases, only two ramps are required to get the maximum straightening from each change in elevation, although additional ramps may be deployed in particular situations. The ramps can be substantially straight lines at angles for instance between 30 and 75 degrees. The ramps may also be curved or a combination of straight and curved sections. In addition to the straightening action of the ramp, the slope and shape of a ramp may be adjusted to minimize the overlapping or "piling" of one board on top of the other. Each elevation change (each transition between and onto and off of conveyors) can require a different slope and/or shape of the ramps. In one example, a waterfall system designed to run only 2" thick× 12" wide×10 ft long lumber could space the conveyor belts 6+feet apart, the slope of the ramps would be curved, and the waterfall height (elevation change from one conveyor to the next) would be 16 to 24 inches. Another example of a waterfall system for $^{11}/_{16}$" thick×3½" wide×36 inch long boards could space the conveyor belts 30 inches apart, the slope of the ramps could be straight and the waterfall height (elevation change) could be 5 to 7 inches. Also, the ends of the conveyors are referred to herein as adjacent, but as noted, the term adjacent can mean slightly overlapping or exactly next to or simply close or proximate as noted in the 6+foot and 30 inch distances apart noted in the examples above.

It has been found that a waterfall system with at least two waterfall configurations is effective in straightening boards. It is necessary that the waterfall height (aka, drop) from one surface onto another cannot be too short, but it also cannot be too tall. The drop here discussed is the distance from the top surface of the second end of a first conveyor or other board feeder onto the top surface of a second conveyor or board machine destination. If this waterfall/drop height is too short, then gravity will not have enough time to speed a board down from the higher surface to the lower surface. If the drop height is too great, then there can be a challenge handling the board and its speed when falling from high to low. For the purposes of the present invention, the drop height of each waterfall is from 3 to 24 inches, or alternatively 4 to 12 inches, or still further alternatively, 5 to 9 inches. Of course, the waterfall/drop height will vary by the dimensions of a board being transported as shown in the examples above.

A swinging stop, in the form of a flat pendulum, may also be used in order to additionally straighten and singulate the boards as they travel on the board conveyor apparatus described herein. If a board is traveling at a slight angle (when lying flat on the conveyor, one end of the board is further forward than the other end in the direction of travel), the corner/end of the board that is relatively further forward hits the swinging stop and the board begins to straighten out as the other corner/end continues to travel forward. Once the board aligns so that the long edge is pushed flush against the swinging stop, the board pushes the stop backwards in the direction of travel of the board and is then free to drop down onto the next tier of the waterfall conveyor. The stop also could be positioned so that the board will only rotate over the end of conveyor when fully straightened by the stop. Either position ensures the board is exiting the waterfall conveyor with the long side perpendicular to the direction of travel of the board.

A swinging stop may be attached to and a part of the board conveyor apparatus, or alternatively, it may be carried on a gantry that positions the stop so that it is hanging over the top surface of one of the conveyors in the system. Alternatively, the stop may be proximate the second end of a conveyor so that straight boards may pass under the stop as they roll off of a conveyor surface without being held up by the stop. In one example, the stop is placed a small distance past the end of one of the conveyor second ends, but it is still proximate that second end. In some examples, the offset of the stop from the second end of a conveyor may be 1-4 inches depending on the width and height of the boards on the conveyor. The spacing is determined for the width of the boards to be straightened and may need to be adjusted for a large range. The height of the stop is determined for the thickness of the boards. The goal is to minimize the number of adjustments, increase the range of sizes that can be accommodated and make the area easy to clear jams or self-clearing. In a perfect world the stop would be adjusted to match each size of board being straightened and be fixed to the frame. The stop may be formed of metal or wood or plastic/rubber, or combinations thereof. The face of the stop is 3 or 6 times taller than the thickest board so that top boards in a stack of multiple boards do not go over the face. The stop face is 1-2 ft longer than longest boards that the system will handle. To aid in clearing jams the stop face is allowed to pivot out of the way of the board path. The pivoting stop needs to have enough inertia to resist the force of the advancing end of the board at speed on the conveyor so that the "trailing" end catches up. The face could weigh between 30 and 80 pounds or more. The stop face is mounted on pairs of pivoting arms that have adjustable lengths and a means to limit the minimum distance to the end of the upper conveyor. The pivot arms can be 3 to 24 inches long and made of wire, chain or rigid links. The pivoting action can be due to bending of the arms or rotation around an axis. The axis of rotation can be metal on metal or some combination of bearings or bearing material and shafts. Since the board contacting the swinging stop causes it to move away from the end of the conveyor, the stop returns to and then past the rest position after the board drops away. The swinging face opens and closes the spacing with the end of the conveyor. A larger spacing will reduce the efficiency of the straightening action, but the smaller spacing causes backups and jams. A pair of adjustable restraints is provided to prevent the spacing from closing past the required minimum. The restraints can be made of wire, chain and flexible or rigid links. The length of the restraint is determined by the distance to a supporting structure.

Upon reaching the end of travel of the board conveyor apparatus, a board is then dropped in the direction of travel into the receiving hopper or guide of the next board processing machine. In one example case, a notcher machine is positioned at the end of the waterfall conveyor so that the aligned boards can be dropped into the receiving infeed guide of the notcher. It is of note that any equipment which uses a stream of single boards can be used in this process. A notcher machine is used in this case for example.

This method has discussed by example as a transfer conveyor between an unscrambler-like machine and a wood processing machine such as a notcher machine, board stacker, or trim saw in the lumber industry. The application of a transfer board conveyor apparatus as has been outlined in this detailed description is not limited to use between an unscrambler and a notcher only, but can be used between two wood processing machines of any kind where one machine has an exit and the next machine has a receiving hopper or an infeed guide conveyor. It is not necessary for the waterfall conveyor apparatus to have more than two tiers or a swinging stop to singulate and straighten wooden boards. More tiers may aid in singulation of boards. The waterfall conveyor can consist of two tiers, and be angled on an incline toward the next machine, or angled on a decline to the next machine. The nature of the method simply consists of a conveyor dropping boards into the receiving hopper or infeed guide of another machine with gravity assisting in the singulation of the boards.

Figure 3:
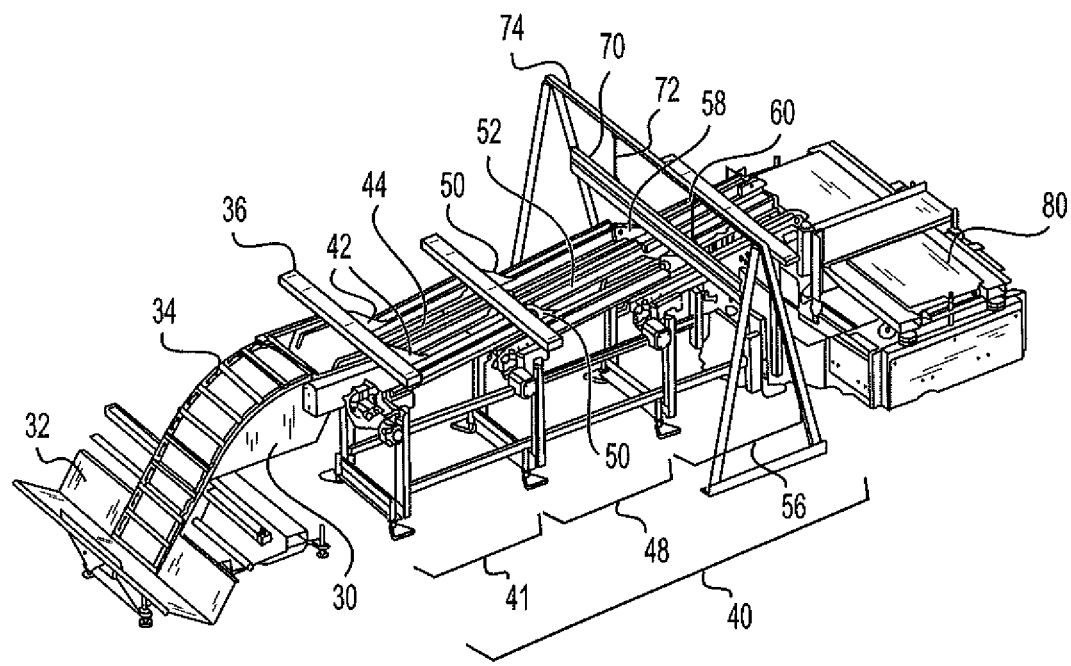
FIG. 3 is a perspective view of an example of a board conveyor apparatus as described herein positioned between an unscrambler machine and a notcher machine.
Figure 4:
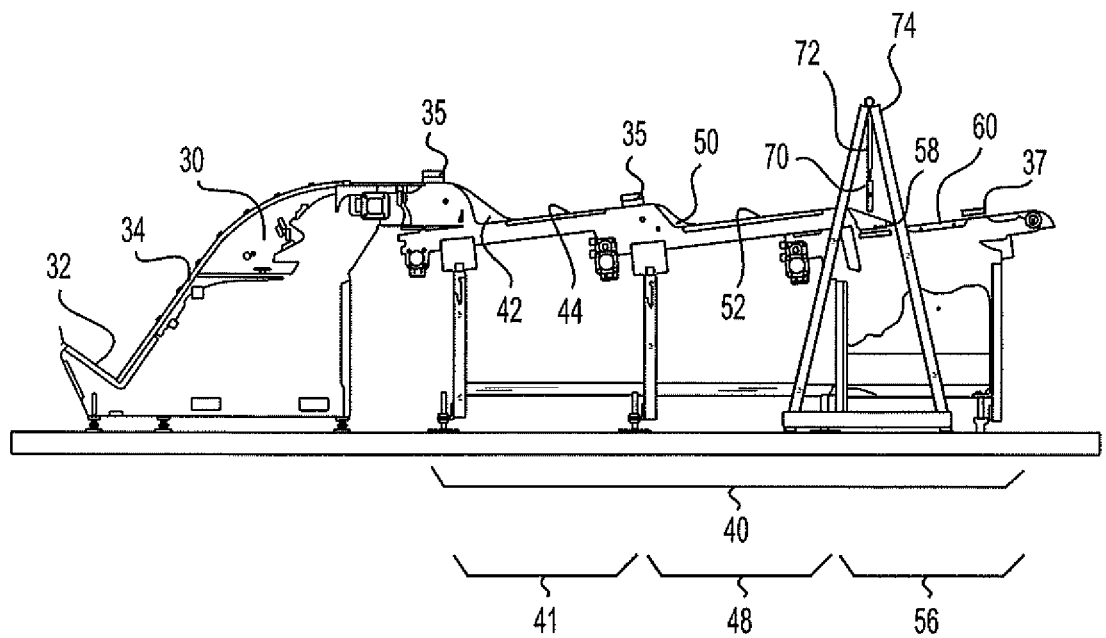
FIG. 4 is a side view of an unscrambler machine feeding boards onto a board conveyor system as described herein.

Turning to the drawings, FIGS. 3 and 4 illustrate a board straightening and singulating system 40 positioned in between an unscrambler 30 that feeds boards 36 onto the conveyor system and a notcher machine 80 that receives the boards. The unscrambler 30 includes a hopper 32 where loose boards are tossed. Using a chain and lug 34, boards 36 are lifted upwardly to the beginning of the conveyor system 40 while moving in the left to right direction. The system 40 is comprised of three conveyors 41, 48 and 56 as shown in the direction of movement of a board 36. The first conveyor 41 has ramps 42 that provide a surface for boards to slide down onto the conveyor belts 44. The ramps 42 are on the first end of the conveyor 41. The opposite second end of the first conveyor 41 delivers boards to the second conveyor 48 which includes ramps 50 and conveyor belts 52. The ramps 50 are on the first end of the conveyor 48 and deliver the boards 36 from the second end of the first conveyor 41 to the second end of the second conveyor 48. Suspended above the second end of the second conveyor 48 is a swinging singulating stop 70 in the form of a flat pendulum that is suspended on chains 72 from a gantry 74. The stop 70 is positioned so that it engages boards moving from left to right along the conveyor system 40. If a board is crooked, then the stop 70 helps to straighten it. If a board is accidentally stacked on top of another board as shown in boards 35, then the stop 70 will engage the pair of boards and knock the top board off of the bottom board to singulate those boards. The stop 70 is weighted and suspended above the second end of the second conveyor 48 according to the boards being transported by the conveyor system 40. Finally, the third conveyor 56 includes ramps 58 on the first end and a conveyor 60 that has a second end at the notcher machine 80.

Figure 5:
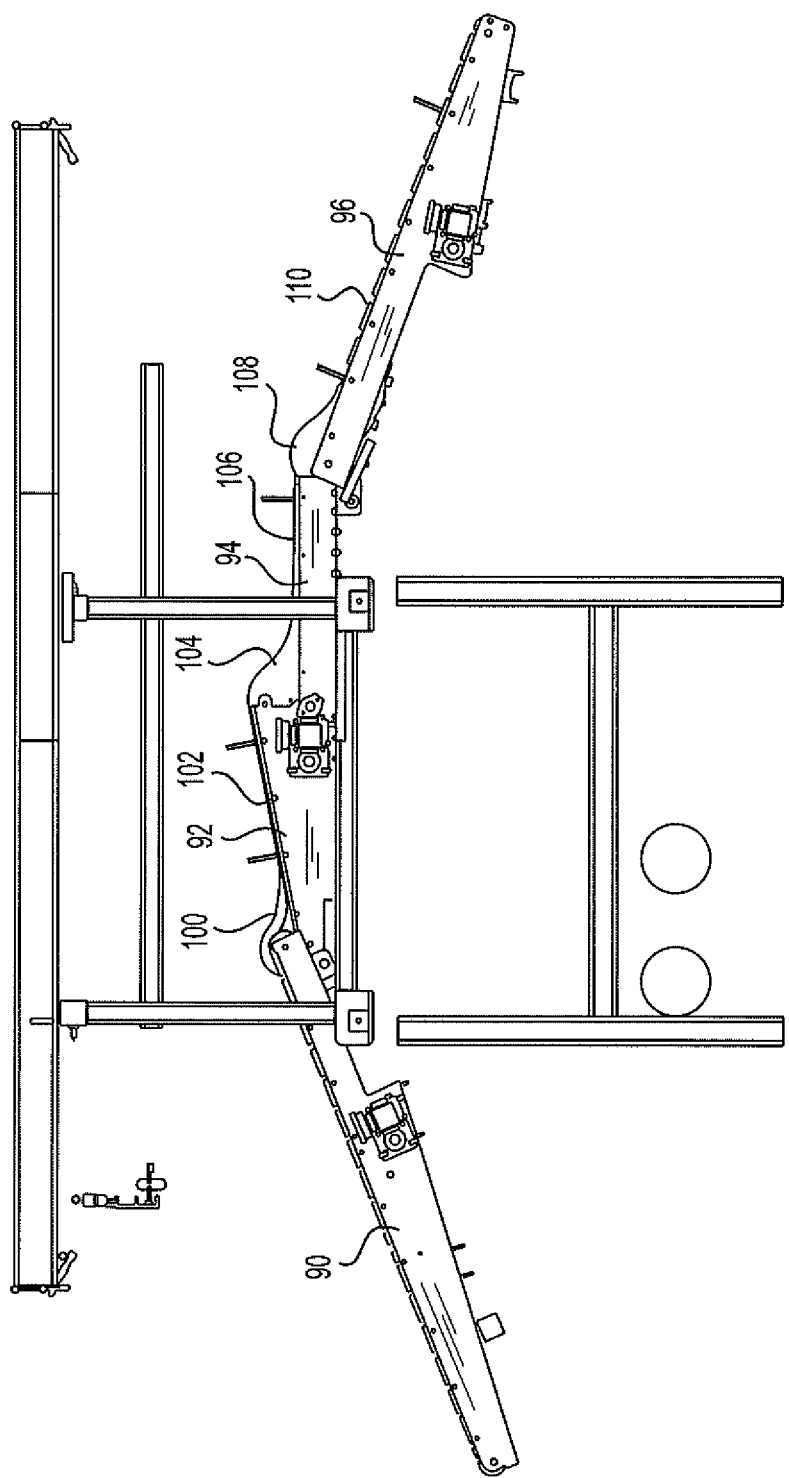
FIG. 5 is a side view of a board conveyor apparatus that moves both upwardly and downwardly along its length in the direction of travel from left to right as shown.

FIG. 5 is an illustration that demonstrates that conveyors can move upwardly or downwardly. In FIG. 5, there are four conveyors 90, 92, 94 and 96 moving from left to right in the direction of travel of boards on the system. Conveyor 90 moves in an upward direction to the point where it meets the first end of conveyor 92. Conveyor 92 includes a ramp 100 on its first end and has a top surface 102 and on its second end is adjacent to conveyor 94. Conveyor 92 also tilts upwardly from its first end adjacent conveyor 90 and its second end adjacent conveyor 94. Conveyor 94 includes ramp 104 on its first end adjacent conveyor 92 and includes a top surface 106. Conveyor 94 is substantially flat along its length (but for ramp 104). Conveyor 96 has a ramp 108 on its first end adjacent conveyor 94. The ramp 108 drops down to the relatively lower surface 110 of conveyor 96. Conveyor 96 is tilted downwardly in the direction of travel. As is disclosed in this example, the first end of a first conveyor may be lower, higher, or the same height as the second end of a last conveyor in a system in order to lift, lower or keep the same height respectively of a board traveling along the conveyor system.

Figure 6:
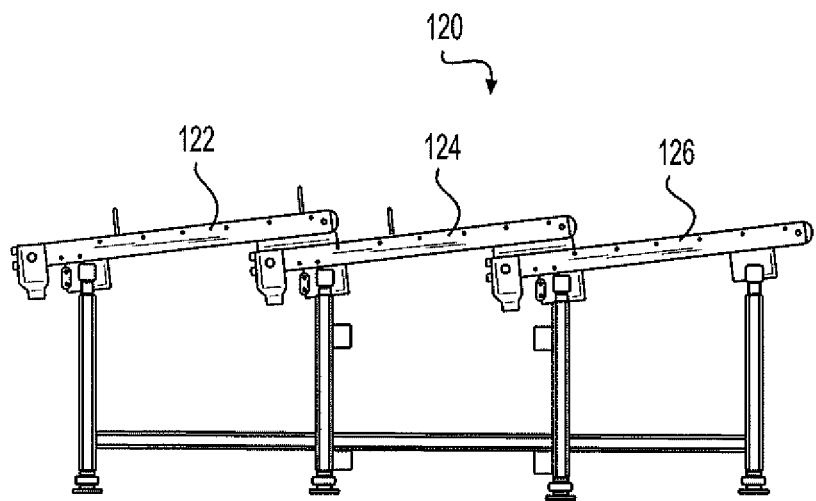
FIG. 6 is a side view of an example of board conveyor apparatus which does not have a guide ramp between conveyors.

FIG. 6 is a side view of a conveyor system 120 including three adjacent conveyors 122, 124 and 126 according to an alternative example of a conveyor system as described herein. In this conveyor system 120, there are no ramps positioned between conveyors 122, 124 and 126. Hypothetical boards could move from left to right and simply drop down from one conveyor to the next adjacent conveyor without the need for a ramp.

Figure 7A:
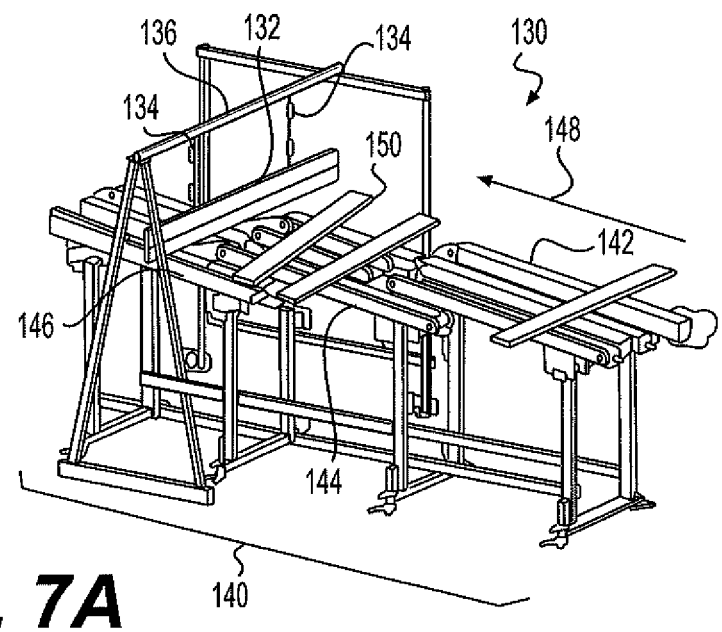
FIGS. 7A-7D illustrate the movement of a board on a conveyor and it interaction with a swinging singulating stop.
Figure 7B:
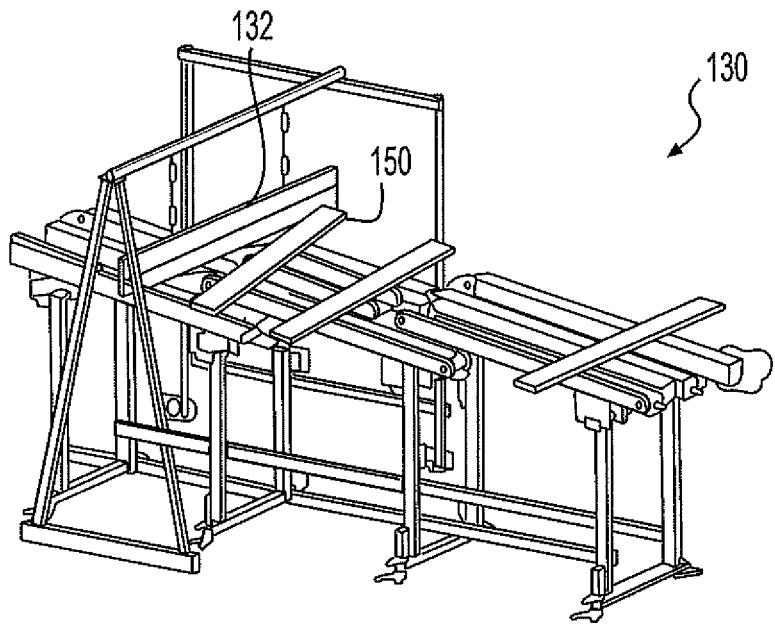
Figure 7C:
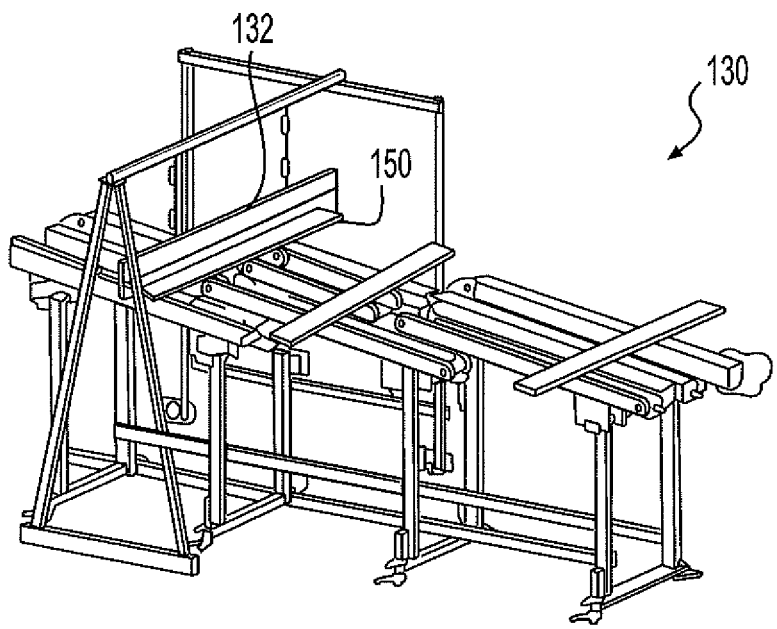
Figure 7D:
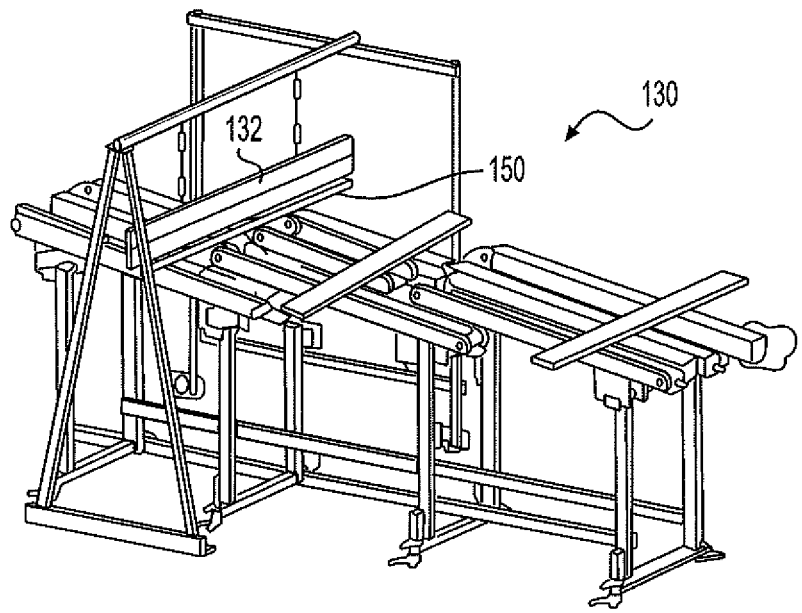

FIGS. 7A-7D illustrate the operation of a swinging singulating stop 132. The conveyor system 130 includes three conveyors 142, 144 and 146. In this example, boards move in direction 148 from right to left on the conveyor system 130. The stop 132 is hung on loose chains 134 from a gantry 136. In this figure, gantry 136 is a separate component from the conveyor 144 or 146, however, it could alternatively be fixed directly to the conveyor system. In FIG. 7A, a board 150 that is crooked on conveyor 144 approaches the stop 132. In FIG. 7B, the leading edge of board 150 bumps into the stop 132. As shown in FIG. 7C, the board 150 is held up and straightened by the stop 132. In FIG. 7D, the board 150, fully engaged with the stop 132, pushes the stop and makes it swing backward, thereby allowing the board to rotate over the end of the conveyor and to continue to move in the direction 148. The stop 132 also could be positioned so that the board 150 is held up and straightened until it is fully engaged when it will rotate over the end of conveyor 144 and continue to move in the direction 148 without displacing the stop backwards.

Figure 8A:
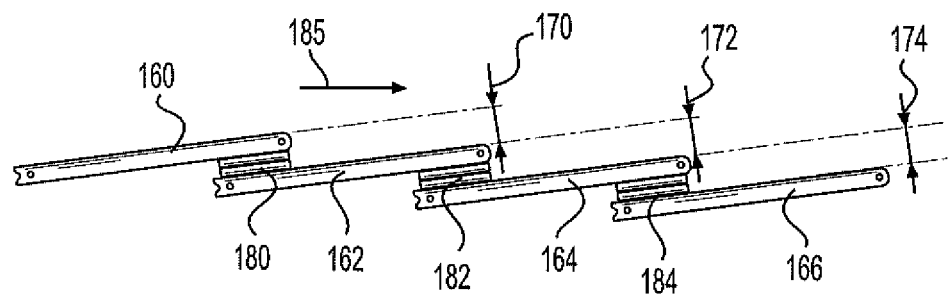
FIG. 8A-8C are side views of conveyors and ramps having multiple alternative height differentials between the adjacent conveyor surfaces.
Figure 8B:
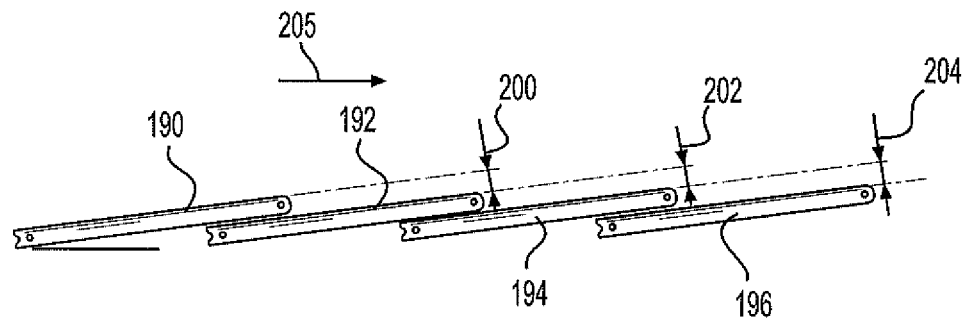
Figure 8C:
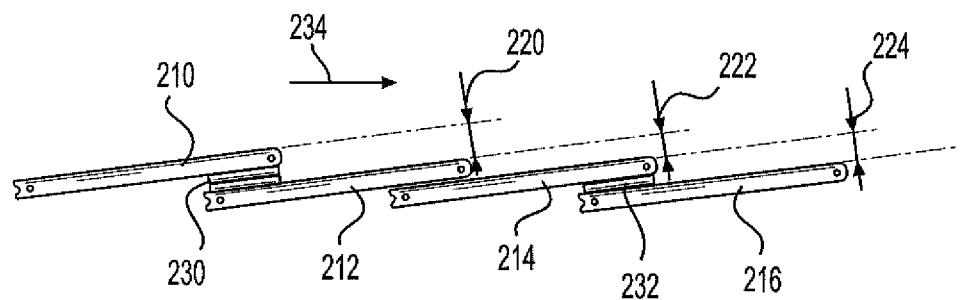

FIGS. 8A-8C illustrate that the drop height between the top surfaces of adjacent conveyors may vary. In FIG. 8A, there are four conveyors 160, 162, 164 and 166. In the direction of travel 185, there are three drops between the conveyors 160, 162, 164 and 166. The drop heights 170, 172 and 174 are all uniform. Spacers 180, 182 and 184 are used to select the specific drop heights 170, 172 and 174. In FIG. 8B, there are four conveyors 190, 192, 194 and 196. The drop heights 200, 202 and 204 in the direction of travel 205 are also uniform like in FIG. 8A, but in this example, the drop heights 200, 202 and 204 are much shorter than drop heights 170, 172 and 174 shown in FIG. 8A, because there are no additional spacers used in FIG. 8B. Finally, in FIG. 8C, there are four adjacent conveyors 210, 212, 214 and 216 that move boards in the left to right direction 234. The drop heights 220, 222 and 224 are all different. Drop height 220 is the tallest because of the use of spacers 230 between conveyors 210 and 212. Drop height 222 is the shortest, because there are no spacers between conveyors 212 and 214. Drop height 224 is between drop heights 220 and 222, because there is the use of a single spacer 232 between conveyors 214 and 216. Of course, other heights and combinations of drop heights may be deployed in individual conveyor situations.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A board conveyor apparatus for use in between components of a board processing system, the conveyor apparatus comprising:
 a first conveyor, a second conveyor and a third conveyor connected end to end to each other, wherein the first conveyor, second conveyor and third conveyor each have their own first end and second end with a direction of travel from the first end to the second end of each first conveyor, second conveyor and third conveyor;
 wherein the second end of the first conveyor is adjacent the first end of the second conveyor whereby boards are conveyed on the first conveyor onto the second conveyor, and wherein the second end of the second conveyor is adjacent the first end of the third conveyor;
 a plurality of boards that have a length and width and the length of the boards is greater than the width of the boards wherein the boards are adapted to be aligned on the first, second and third conveyors relatively perpendicular to the direction of travel of the boards and further wherein a width edge is the leading edge of the boards in the direction of travel of the boards;
 wherein each conveyor comprises a moving surface that transports the boards along the first conveyor to the second conveyor, along the second conveyor to the third conveyor, and along the third conveyor to the second end of the third conveyor,
 the board conveyor apparatus further comprising a multiple waterfall configuration wherein the second end of the first conveyor is relationally above the first end of the second conveyor and the second end of the second conveyor is relationally above the first end of the third conveyor;
 wherein boards moving on the second end of the first conveyor will fall by gravity onto the first end of the second conveyor, and boards moving on the second end of the second conveyor will fall by gravity onto the first end of the third conveyor;
 whereby the action of boards falling by gravity will straighten the boards so that they are more aligned in the perpendicular orientation relative to the direction of travel.

2. A board conveyor apparatus as described in claim 1, further comprising
 four or more conveyors connected end to end with each other in a line with each conveyor having a first end and a second end and a moving surface, and there is a waterfall configuration wherein the second end of a conveyor in the direction of travel is relationally above the first end of the next adjacent conveyor in the direction of travel, thereby creating three or more waterfall configurations to better straighten boards in the perpendicular orientation to the direction of travel of the boards along the conveyor apparatus.

3. A board conveyor apparatus as described in claim 1, wherein the waterfall configuration comprises a ramp from the second end of the first conveyor to the first end of the second conveyor to guide the fall of a board from a top surface of the first conveyor to a top surface of the second conveyor.

4. A board conveyor apparatus as described in claim 1, further comprising a swinging stop having a flat pendulum positioned above a first conveyor surface, and a height of the swinging stop above the first conveyor surface is adapted so that the stop will physically engage a board traveling on the first conveyor surface, and wherein the swinging stop acts to first straighten the board but then swing out of the way and allow the board to continue to travel in the direction of travel on the conveyor apparatus.

5. A board conveyor apparatus as described in claim 4, wherein the first conveyor surface defines a width that is perpendicular to the direction of travel, and the swinging stop has a width that is equal to or greater than the width of the first conveyor surface.

6. A board conveyor apparatus as described in claim 4, wherein the swinging stop is suspended above the first conveyor surface by a gantry that is connected to the swinging stop by at least two cords.

7. A board conveyor apparatus as described in claim 4, wherein the first conveyor surface is the top surface of the second conveyor.

8. A board conveyor apparatus as described in claim 4, wherein the first conveyor surface is the top surface of the third conveyor.

9. A board conveyor apparatus as described in claim 4, wherein the swinging stop has a first weight equal to or greater than a second weight of a board traveling on the conveyor.

10. A board conveyor apparatus as described in claim 1, wherein a waterfall height defined by the difference in a height of the second end of the first conveyor and a height of the first end of the second conveyor is equal to or greater than a width of a board traveling on the conveyor apparatus.

11. A board conveyor apparatus as described in claim 10, wherein a waterfall height defined by the difference in a height of the second end of the first conveyor and a height of the first end of the second conveyor is from 3 to 16 inches.

12. A board conveyor apparatus as described in claim 10, wherein a waterfall height defined by the difference in a height of the second end of the first conveyor and a height of the first end of the second conveyor is from 4 to 12 inches.

13. A board conveyor apparatus as described in claim 10, wherein a waterfall height defined by the difference in a height of the second end of the first conveyor and a height of the first end of the second conveyor is from 5 to 9 inches.

14. A board conveyor apparatus as described in claim 1, wherein a waterfall height defined by the difference in a height of the second end of the preceding conveyor and a height of the first end of the following conveyor is different from waterfall to waterfall on the conveyor apparatus.

15. A board conveyor apparatus as described in claim 1, wherein a height defined by the difference in a height of the first end of the first conveyor and a height of the second end of the last conveyor is equal to or approximately zero.

16. A board conveyor apparatus as described in claim 1, wherein a height of the first end of the first conveyor is lower than a height of the second end of the last conveyor whereby there is a lift of a board traveling on the conveyor apparatus.

17. A board conveyor apparatus as described in claim 1, wherein a height a height of the first end of the first conveyor is higher than a height of the second end of the last conveyor whereby there is a lowering of a board traveling on the conveyor apparatus.

18. A board conveyor apparatus as described in claim 4, further comprising a swinging stop having a flat pendulum positioned above a first conveyor surface and proximate the second end of the first conveyor, a height of the swing stop above the first conveyor surface adapted so the swing stop will physically engage a board traveling on the first conveyor surface, and a distance of the flat pendulum from the second end of the first conveyor surface that permits a straight board to rotate off the end of the first conveyor surface without causing the swing stop to swing backwards, wherein the swinging stop acts to first straighten the board but then is positioned so the board will rotate over the end of the first conveyor and pass under the swinging stop.

* * * * *